United States Patent [19]

Migozzi et al.

[11] Patent Number: 4,735,473
[45] Date of Patent: Apr. 5, 1988

[54] DEVICE FOR OPTICAL-CABLE TRANSPORT AND COMBINATION OF LIGHT IMAGES

[75] Inventors: Jean B. Migozzi, Orsay; Francois Grasdepot, Paris, both of France

[73] Assignee: Thomson-CSF, Paris, France

[21] Appl. No.: 860,010

[22] Filed: May 5, 1986

[30] Foreign Application Priority Data

May 3, 1985 [FR] France .................. 85 06770

[51] Int. Cl.$^4$ .......................... G02B 24/17; G02B 5/32
[52] U.S. Cl. .................................. 350/3.7; 350/3.72; 350/96.25; 350/174
[58] Field of Search ............ 350/3.72, 174, 3.7, 350/96.25

[56] References Cited

U.S. PATENT DOCUMENTS

| | | | |
|---|---|---|---|
| 3,633,988 | 1/1972 | Farrar | 350/3.7 |
| 3,945,716 | 3/1976 | Kinder | 350/3.72 |
| 4,398,799 | 8/1983 | Swift | 350/174 |
| 4,407,564 | 10/1983 | Ellis | 350/174 |
| 4,447,128 | 5/1984 | Ferrer | 350/174 |
| 4,582,389 | 4/1986 | Wood et al. | 350/174 |
| 4,655,540 | 4/1987 | Wood et al. | 350/3.7 |

FOREIGN PATENT DOCUMENTS 0064899 11/1982 European Pat. Off.
2522804 9/1983 European Pat. Off.

*Primary Examiner*—Bruce Y. Arnold
*Assistant Examiner*—Martin Lerner
*Attorney, Agent, or Firm*—Cushman, Darby & Cushman

[57] ABSTRACT

In a device for optical-cable transport and combination of light images, the ends of an optical cable forming part of the device are coupled with lenses which are in turn associated with an optical system for dispersing radiation as a function of the wavelength in order to suppress any raster effect. This optical system is constituted at one end of the optical cable by a reflecting holographic mirror, the chromatic aberrations of which form the dispersion. At the other end of the cable, the optical system consists of a partially transparent holographic mirror for reflecting a first image to be transported and re-forming this image by suppressing the aberrations and combining said first image with a second image. The first image can be a synthetic image displayed on a CRT indicator and the second image can be the surrounding landscape in an application such as a helmet sight visor.

6 Claims, 2 Drawing Sheets

DEVICE FOR OPTICAL-CABLE TRANSPORT AND COMBINATION OF LIGHT IMAGES

BACKGROUND OF THE INVENTION

1. Field of the Invention

The present invention relates to a device for transporting a first light image by means of an optical cable and combining it with a second light image in order to permit combined observation of both images. The use of the invention is more particularly contemplated in the field of helmet sight visors for viewing a firing reticle or a synthetic image superimposed on a view of the surrounding landscape.

2. Description of the Prior Art

The term "optical cable" is understood to designate an ordered bundle of optical fibers or in other words a close-packed assembly of light-conducting fibers so arranged that the ends corresponding to a given fiber are located in homologous positions at x and at y on the two flat end faces of the bundle. The homologous arrangement of the fibers at each end permits image transport.

The result achieved by the basic design of an ordered bundle is that, if an image is formed by an optical lens on a flat end face, the light energy is transmitted by the fibers at an array of points and is again ordered in the same manner at the opposite end, whereupon the light image is re-formed, with due allowance for transmission losses. When the exit image is employed for visual display, the observer usually views the image through an eyepiece or magnifying lens in order to benefit from the enlargement thus produced since the cable has relatively small dimensions. In another application, the exit image is transported by the exit optical system to the light-receiving target of a television camera tube or to the matrix array of a charge-coupled device (CCD).

These devices are subject to disadvantages which arise from re-grouping of the cable fibers at x and y since this produces a raster effect. In order to overcome this drawback as well as the difficulties arising from fiber cuts, a known practice disclosed in French patent No. FR-A-2 504 758 (or European patent No. EP-A-0 064 899) consists of making use of light-image transport by optical cable in which means are provided for eliminating the raster effect. These means consist of a first deflecting prism which is placed upstream of the entrance objective and which produces dispersion of radiation as a function of the different wavelengths. The result thereby achieved is that the radiation corresponding to one image point is focused by the entrance objective on a number of fibers of the entrance face of the optical cable. Similarly, the exit face of the cable is followed by an exit lens in order to permit viewing of the image and said exit lens is in turn followed by a second prismatic element for inversely combining the exit radiations and re-forming the image.

SUMMARY OF THE INVENTION

The aim of the invention is to improve this image transport technique by employing holographic optical elements as dispersion means and by providing in addition a combined presentation of the image transported by the cable in superimposed relation to another image such as, for example, a view of the external landscape as in the case of a helmet sight visor.

In pilotage collimators which may or may not be carried by a helmet, combined viewing of images is usually performed by means of a partially transparent mirror. It is also a known practice to make use of a holographic mirror for carrying out this function but at the cost of considerable chromatic aberrations requiring corrective optical formulae.

In the solution proposed, these defects are eliminated by virtue of the fact that the holographic element employed at the optical cable exit corresponds to the entrance holographic element and performs the inverse function, thus eliminating the chromatic aberrations introduced by the entrance mirror.

BRIEF DESCRIPTION OF THE DRAWINGS

Other features of the invention will be more apparent upon consideration of the following description and accompanying drawings, wherein.

DESCRIPTION OF THE PREFERRED EMBODIMENTS

Figure 1:
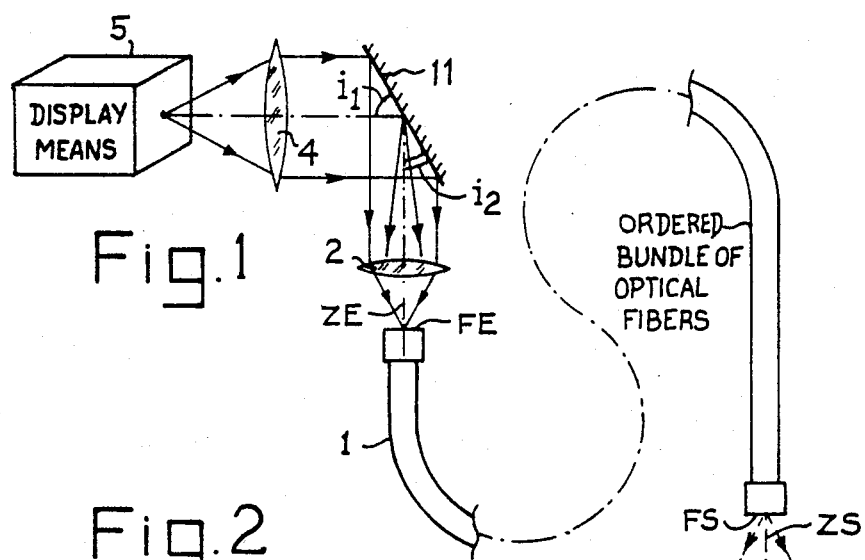
FIG. 1 is a general diagram of a device in accordance with the invention for transporting and combining light images.
Figure 5:
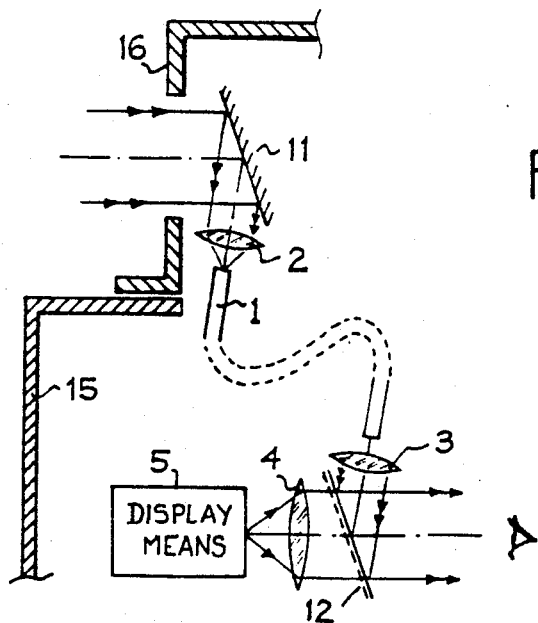
FIG. 5 illustrates an alternative embodiment of the system shown in FIG. 1.

Referring to FIG. 1, the light-image transport device comprises in known manner an ordered bundle 1 of optical fibers, an entrance optical lens 2 and an exit optical lens 3. The optical axes ZE and ZS of the lenses 2 and 3 are perpendicular to the flat end faces of the optical cable 1, respectively at the entrance face FE and at the exit face FS. The lens 2 focuses the image to be transported on the plane of the entrance face FE. The light image is reproduced in an identical manner on the exit-face side FS since the cable has an ordered structure. The radiation scattered by each fiber end of the plane FS is passed through the lens 3 and emerges as a parallel or collimated beam in order to permit visual observation of said radiation. Similarly, it is considered that the radiation received on the lens 2 is a parallel radiation and that the function of the lens 2 is to ensure focusing in the plane of the entrance face. The incident radiation is veritably in the form of parallel rays in the case of an external scene, as illustrated in FIG. 5. In the case of a light image located at a short distance as shown, an objective lens 4 produces a beam of parallel rays. By way of example, the element 5 represents an image display tube.

Figure 2:
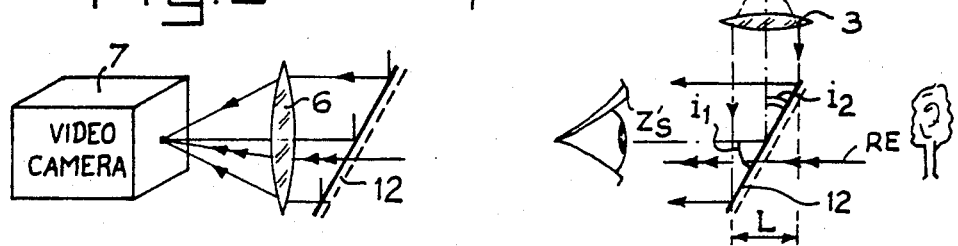
FIG. 2 is a detail diagram of an alternative embodiment of the device shown in FIG. 1.

In accordance with the invention, a first holographic optical element 11 is introduced into the assembly of holographic optical system components. Said first optical element precedes the entrance lens and performs the function of a reflecting mirror. A second holographic optical element 12 is placed on the exit side downstream of the lens 3 and performs the function of a partially transparent mirror. These mirrors 11 and 12 are inclined respectively to the entrance axis ZE and exit axis ZS at the same angles. The mirror 11 reflects the radiation corresponding to a first image towards the lens 2, this radiation being in the form of a parallel beam. At the exit end, the mirror 12 inversely reflects the parallel radiation which emerges from the lens 3 and permits onward transmission of the radiation RE derived from a second image (FIG. 5) or from the surrounding landscape. The radiation RE is also in the form of parallel rays. Thus the two images are combined by the holographic element 12 and can be viewed directly. In the case of indirect viewing, it is also possible by means of a lens 6 to focus these radiations on a video camera tube or matrix array 7 as shown in FIG. 2.

Figure 3:
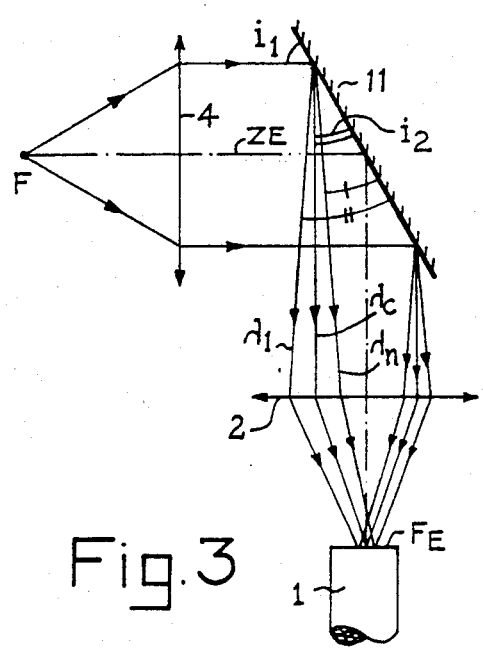
FIG. 3 is a partial diagram of the device in accordance with FIG. 1 for showing the dispersive effect of the entrance mirror.

FIG. 3 illustrates the dispersive effect produced by the holographic entrance mirror. The incident radiation originating from a point F of the image is deviated by the mirror 11 in a different manner as a function of its wavelength and will accordingly fall on a number of fibers of the entrance face after focusing by the lens 2.

Figure 4:
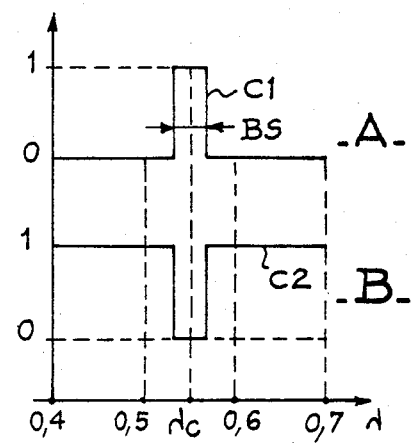
FIG. 4 is a diagram of response curves defining the spectral bands of the holographic elements employed in the system of FIG. 1.

The configuration shown in FIG. 1 corresponds more particularly to the use of a visual-display cathode-ray tube (CRT) 5 which has a narrow spectral range whilst the spectrum of the second image corresponds to the surrounding landscape and covers the entire visible spectrum. The spectral band of the cathode-ray tube 5 is in the vicinity of the green region and is centered, for example, on the wavelength 5460 Å, the width BS of the spectral band being approximately ±35 Angströms on each side of said wavelength. This response curve is shown in FIG. 4A. Similarly, FIG. 4B shows the response curve produced in this case by transmission of the holographic mirror 12. It will be understood that this mirror 12 exhibits the same curve as the mirror 11 in reflection. It will also be apparent that transmission of the visible spectrum is ensured except for the wavelengths of the narrow band BS which are reflected from the mirror 12. Thus the dispersions which are produced by the entrance mirror 11 and which would constitute objectionable chromatic aberrations in the event of utilization of this holographic element alone eliminated at the exit by the holographic mirror 12 which has the same reflecting function as the entrance mirror and produces the reverse effect. It should also be pointed out that the beam is reflected at an angle of incidence i$_1$ and an angle of reflection i$_2$, these angles being of any desired value and different from each other. The same values are again found at the exit but reversed. Thus the angle i$_2$ is the angle of incidence and the angle i$_1$ is the exit angle whilst the mirrors 11 and 12 are set at the same angle of inclination with respect to the corresponding optical axes ZE and ZS. The angles i$_1$ and i$_2$ may be chosen according to requirements. Thus the angle i$_2$ as shown in FIG. 3 can have a smaller value than the angle i$_1$. In consequence, it is possible to employ lenses 2 and 3 associated with the cable 1 and having a small diameter. It is also possible to bring the viewer's eye considerably closer to the combining lens 12.

FIG. 5 shows an alternative embodiment corresponding to a reverse arrangement in which the first image is that of the external landscape and the second image is that of a display CRT. The constructional design is similar but the elements 5 and 4 are now located at the exit end in order to form the second image which is transmitted through the mirror 12 to the observer. In this configuration, the optical elements exhibit in reflection the spectral response indicated in FIG. 4B whilst the spectral response in FIG. 4A corresponds to that of transmission through the mirror 12. The assembly which is constructed in accordance with this arrangement can be employed in configurations in which a direct view of the surrounding landscape is not provided. This is the case, for example, with epidiascopes for tanks in which the observer is stationed within the tank crew compartment 15 and a view of the exterior is obtained by means of openings formed in the turret 16. Consideration could also be given to the use of this system in other fields of application such as remote monitoring of zones which are not readily accessible. In an application of this type, the end portion of the cable 1 together with the associated elements 2 and 11 can be displaced or positioned within a zone to be monitored which may be located within a nuclear reactor, for example.

Figure 6:
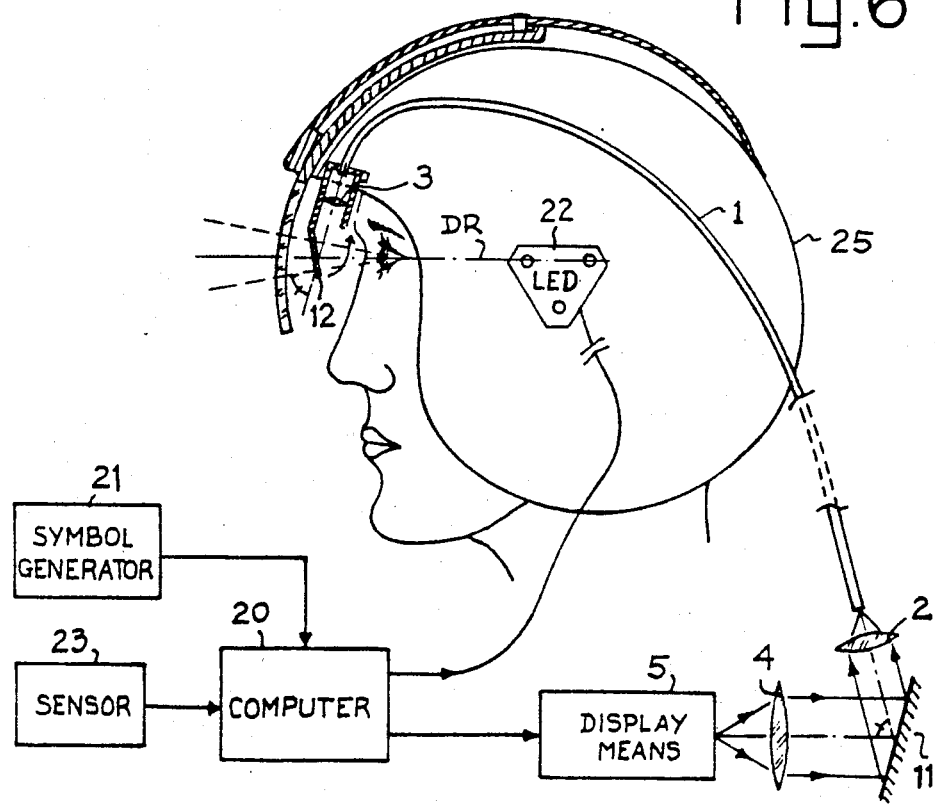
FIG. 6 is a diagram of an application in which the device of FIG. 1 is employed in a helmet sight visor.

FIG. 6 represents an application of the device shown in FIG. 1 to a helmet sight visor. The optical cable 1 is of sufficient length to be coupled at its input end to a CRT display device 5 which is placed at a distance and not carried by the helmet 25, the opposite end portion of the cable being attached to said helmet. The lens 3 and the mirror 12 can be grouped together on the helmet and can be of small overall size. The mirror 12 can be so designed as to be capable of swinging-back in order to ensure that it can no longer be moved away from the optical field of view during periods of non-use. The other elements shown in the figure comprise an onboard computer 20 and a character generator 21 which serve to produce a synthetic image display on the screen of the cathode-ray tube 5. The other elements are constituted by an array 22 of electroluminescent diodes and by a photosensor 23 for locating the direction of an axis which is related to the helmet 25 such as, for example, the direction DR of the pilot's line of sight. A direction-finding device of this type is described in French patent No. 2 399 033 (or in U.S. Pat. No. 4,193,689, or in British patent No. 2,002,986).

The devices in accordance with the invention which have just been described make use of the properties of reflection holograms for reducing to a single optical element the dispersion means placed at the exit and the image-combining means. Furthermore, this exit holographic element achieves perfect compensation for the chromatic aberrations introduced by the first input (entrance) holographic element.

The advantages offered in comparison with the solutions of the prior art are listed below:

reduction in the number of elements and in overall weight;

smaller bulk achieved by reducing the distance L (FIG. 1) between the exit mirror 12 and the observer's eye on the line of sight Z'S, this being due to the properties of holographic mirrors which permit an arbitrary choice of the values of the angles i$_1$ and i$_2$;

improvement in frequency multiplexing since the dispersive power of a hologram is much greater than that of a prism and the transfer of information relating to an image point takes place by distributing the different chromatic components over a greater number of fibers, with the result that breakage of a fiber is a less serious occurrence and the loss of luminosity caused by such breakage is reduced by a substantial factor;

gain in luminance of the displayed image since a holographic mirror has a coefficient of reflection close to 100% in respect of to a spectral band which is identical with that of the CRT whilst the total transmission over the entire spectrum is in the vicinity of 80% as against approximately 50% in the case of a conventional combining mirror;

absence of raster effect in the display provided.

Because of the foregoing, the invention makes it possible to improve any presentation or display system involving the use of image transport by means of an ordered bundle of optical fibers. The invention permits enhanced contrast and better insensitivity to degradation of fibers. Another feature is that the equipment is compact and light. A further effect of the invention is to reduce the number of elements required for presentation of an image after frequency multiplexing. In addition, it is possible to compensate for defects involving chromatic variation of magnification of a holographic imaging component.

It is understood that the alternative embodiments in accordance with the characteristics hereinabove described are included in the invention. By way of example, the reflection along the optical axis both from the mirror 11 at the entrance and from the mirror 12 at the exit can be chosen so as to have an angle value which is different from the right-angle shown in FIGS. 1 to 3. This angle can be either acute as shown in FIGS. 5 and 6 or obtuse.

What is claimed is:

1. A device for transmitting and combining light images in which a first light image is transported by means of an optical cable formed by an ordered bundle of optical fibers terminating in two flat end faces, an entrance face and an exit face, an entrance lens for forming said first image to be transmitted on the entrance face and an exit lens for transferring the image formed on the exit face in order to permit observation of said image, means being provided for eliminating the raster effect produced by the cable, said eliminating means being constituted by a first optical element upstream of the entrance lens for dispersing the received radiation as a function of the wavelength and a second optical element downstream of the exit lens for inversely combining the emergent radiation and re-forming said first image, said dispersive optical elements being formed by two holographic optical elements, a first holographic element being constituted by a mirror for reflecting a first predetermined spectral band corresponding to said first image, said dispersion being caused by chromatic aberrations exhibited by the first holographic element, the second element being constituted by a partially transparent mirror on the one hand for inversely reflecting the radiation corresponding to said first spectral band and eliminating said aberrations and on the other hand for transmitting the radiation corresponding to a second spectral band which corresponds to a second image to be combined with the first, no wavelength of said first band being contained in said second band.

2. A device according to claim 1, wherein the first image is produced by a visual display device in which the spectrum is reduced to a narrow delimited spectral band of the visible spectrum, said first image being passed through a lens in order to be transmitted in the form of parallel rays to the first holographic optical element, and wherein said second image corresponds to a view of the external landscape through the second holographic element.

3. A device according to claim 2, wherein the first holographic element produces a reflection which is limited to the radiation included in the spectral band corresponding to said first image, wherein the second optical element exhibits in reflection the same response characteristic as the first holographic element and wherein said second optical element exhibits in transmission a response throughout the entire visible spectrum except within the delimited band aforesaid.

4. A device according to claim 2 and constituting a sight visor mounted on a helmet, wherein the second holographic element and the exit lens are carried by the helmet together with a first end of the optical cable whose second end is coupled to elements placed at a distance and not attached to the helmet, said elements being grouped together and constituted by the exit lens, the first holographic optical element and means for generating said first image.

5. A device according to claim 1, wherein the radiation which emerges from the second holographic element by reflection and by transmission is passed through an optical lens which focuses said radiation on a video image pickup device.

6. A device according to claim 1, wherein said first image corresponds to a view of the external landscape and the second image corresponds to a view of an image produced by a visual display device which has a narrow emission spectrum, the radiation corresponding to the first image being received directly in the form of parallel rays by the first holographic optical element, the radiation corresponding to said second image being produced by the visual display device which is followed by an optical lens for producing it in the form of parallel rays at the entrance of the second holographic element.

* * * * *